United States Patent [19]

Watanabe et al.

[11] 4,448,279
[45] May 15, 1984

[54] VEHICLE DRIVE UNIT

[75] Inventors: Masaki Watanabe, Urawa; Goroei Wakatsuki, Fujimi, both of Japan

[73] Assignee: Honda Giken Kogyo Kabushiki Kaisha, Tokyo, Japan

[21] Appl. No.: 366,877

[22] Filed: Apr. 9, 1982

Related U.S. Application Data

[62] Division of Ser. No. 137,603, Apr. 7, 1980, Pat. No. 4,372,415.

[30] Foreign Application Priority Data

Apr. 10, 1979 [JP] Japan ................................ 54-43552
Apr. 20, 1979 [JP] Japan ................................ 54-52999

[51] Int. Cl.$^3$ ............................................. B60K 5/04
[52] U.S. Cl. ...................................... 180/297; 74/710; 180/215
[58] Field of Search .................. 123/179 SE, 179 CC, 123/41.65; 74/7 R, 710; 180/210, 215, 216, 297

[56] References Cited

U.S. PATENT DOCUMENTS

| | | | |
|---|---|---|---|
| 3,004,619 | 10/1961 | Straussler | 180/215 |
| 3,176,525 | 4/1965 | Rose | 74/7 R |
| 3,302,740 | 2/1967 | Giacosa | 180/297 X |
| 3,315,649 | 4/1967 | Lincecum | 123/41.65 X |
| 3,598,093 | 8/1971 | Tahaka | 74/7 R X |
| 3,747,649 | 7/1973 | Densow et al. | 123/179 SE X |
| 4,156,409 | 5/1979 | Nakano | 123/41.65 |

FOREIGN PATENT DOCUMENTS

| | | | |
|---|---|---|---|
| 122247 | 1/1919 | United Kingdom | 180/297 |
| 976014 | 11/1964 | United Kingdom | 180/297 |

Primary Examiner—Joseph F. Peters, Jr.
Assistant Examiner—Michael Mar
Attorney, Agent, or Firm—Irving M. Weiner; Pamela S. Burt; John L. Shortley

[57] ABSTRACT

A drive unit for a vehicle having two juxtaposed drive wheels comprises an engine, an axle for supporting on its ends the drive wheels, a final output gear operatively coupled with the engine and mounted on the axle adjacent to one of the drive wheels, and a power transmitting assembly mounted on the axle adjacent to the other drive wheel, the engine being located between the final output gear and the power transmitting assembly. A crankshaft extends parallel to the axle and supports on one end a flywheel for a generator and on the other end a clutch including a speed changing device. The drive unit is unitized, compact in size, simple in structure, and requires a minimum number of parts.

11 Claims, 15 Drawing Figures

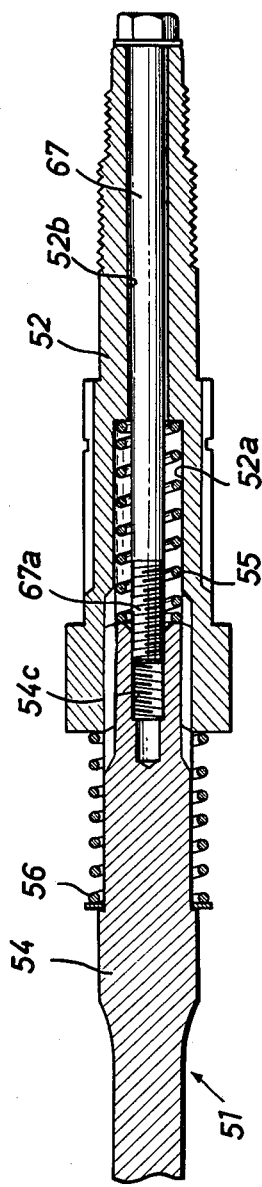
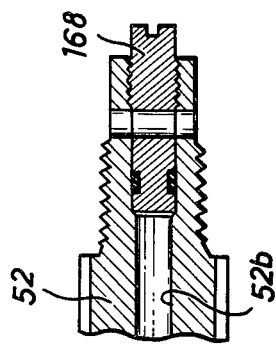
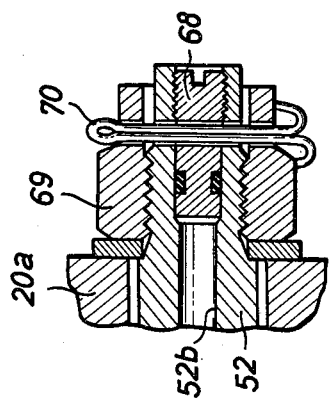

VEHICLE DRIVE UNIT

This is a division of application Ser. No. 137,603 filed Apr. 7, 1980, now U.S. Pat. No. 4,372,415.

BACKGRROUND OF THE INVENTION

1. Field of the Invention

The present invention relates to a drive unit for use on a relatively small vehicle having two juxtaposed drive wheels.

2. Prior Art

Prior drive devices mounted on relatively small vehicles having two juxtaposed drive wheels drive the drive wheels through a belt and pulley mechanism and a train of transmission gears. Such drive devices are not unitized, and hence are relatively large in size. Therefore, the vehicles carrying such drive devices also become large in size.

Such drive devices include a differential mechanism and a one-way clutch mechanism for driving each drive wheel, the mechanisms being located proximal each other and midway between the drive wheels, or being displaced toward one of the drive wheels. The mechanisms have housings of a relatively large diameter, rendering the device and the vehicle large in size and high in profile. Because the mechanisms are displaced toward one of the drive wheels, the vehicle tends to be out of balance in a sideways direction.

SUMMARY OF THE INVENTION

A vehicle drive unit according to the present invention comprises an engine, a final output gear operatively coupled with the engine and mounted on the axle and adjacent to one of the drive wheels, and a power transmitting means provided on the axle adjacent to the other drive wheel, the engine being located between the final output gear and the power transmitting means. The final output gear and the power transmitting means are spaced apart from each other on the axle so as to allow the engine to be located therebetween, with resulting low profile and stability of the drive unit. The drive unit includes a crankshaft extending parallel to the axle and operative coupled to the axle by a transmission mechanism including a clutch. The transmission mechanism is mounted on one end portion of the crankshaft, the other end portion of which supports a flywheel which constitutes a generator and is provided with a ring gear engageable with the pinion of a starting motor for starting the engine.

It is therefore an object of the present invention to provide a drive unit for vehicles which are relatively light and small and have a pair of juxtaposed drive wheels.

Another object of the present invention is to provide a vehicle drive unit which is unitized, small and compact in size, simple in structure, and low in profile.

Still another object of the present invention is to provide a drive unit having a starting motor mechanism which is simple in structure, requires a minimum number of parts, is small in size, and occupies less space.

The above and other objects, features and advantages of the present invention will become apparent from the following description when taken in conjunction with the accompanying drawings which illustrate a preferred embodiment by way of example.

BRIEF DESCRIPTION OF THE DRAWINGS

FIGS. 11 through 13 are longitudinal cross-sectional views illustrative of the manner in which springs are mounted on a composite axle.

DETAILED DESCRIPTION OF THE PREFERRED EMBODIMENT

Figure 14:
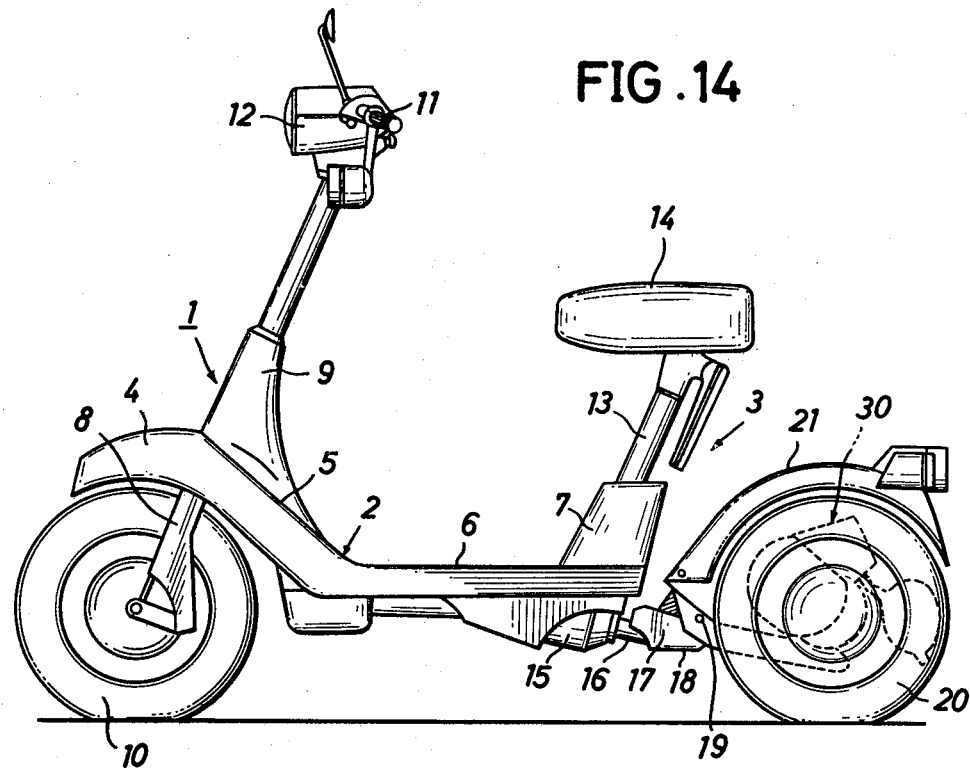
FIG. 14 is a side elevational view of a three-wheeled vehicle having the drive unit of the present invention mounted thereon.
Figure 15:
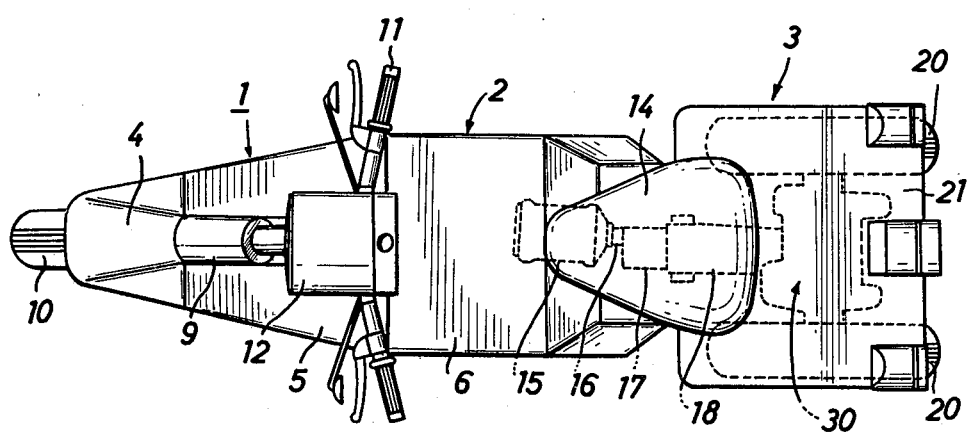
FIG. 15 is a plan view of the three-wheeled vehicle.

FIGS. 14 and 15 illustrate a three-wheeled vehicle 1 to which the present invention is applicable. The invention is also applicable to a three-wheeled vehicle having two front drive wheels, or a four-wheeled vehicle.

The three-wheeled vehicle 1 comprises a front body member 2 and a rear body member 3. The front body member 2 is of a relatively low profile including a front fender 4, a guard 5 extending rearwardly and downwardly from the front fender 4, and a substantially flat floor 6 extending horizontally rearwardly from the guard 5. A box-like foot guard 7 is mounted on a rear portion of, and extends across, the floor 6 so as to protect the driver's feet from interference with the rear body member 3 as it is pivotally moved with respect to the front body member 2.

A support post 9 is mounted on the guard 5 and rotatably supports a front fork 8 having mounted on its lower end a front wheel 10 and on its upper end a handle bar 11 and a housing 12 accommodating therein a head lamp and instrumentation. A seat post 13 extends upwardly from a central portion of the foot guard 7 and supports thereon a driver's seat 14.

The front body member 2 supports on its lower side a coupling 15 having a rolling shaft 16 to which there is fastened a support frame 17 supporting a rear fork 18 pivotable about a pin 19. A drive unit 30 is mounted on the rear fork 18 between a pair of juxtaposed rear wheels 20, 20, the drive unit 30 and the rear wheels 20, 20 being covered with a rear fender 21. The front body member 2 is pivotable laterally with respect to the rear body member 3.

The drive unit 30 will be described with reference to FIGS. 1 through 4. in FIG. 2, the drive unit 30 has a unitized structure including an engine 31, and a housing 32 serving as a crankcase and a transmission casing and disposed below the engine 31. The housing 32 is composed of an upper member 32a and a lower member 32b which are joined together.

The housing 32 is pivotally mounted at its rear portion on a rear end of the rear fork 18 by a pin 22, the housing 32 being supported on the rear fork 18 by rubber mounts 23, 24 located forwardly of the pin 22. Rubber mounts 25, 26 are located forwardly and rearwardly, respectively, of the pin 19 and are disposed between the support frame 17 and the rear fork 18. The pin 22 is pivotally mounted on a link 28 pivoted by a pin 27 to the rear end of the rear fork 18 for increased followability of the drive unit 30 and hence the rear wheels 20, 20. The engine 31 extends rearwardly and upwardly, and the housing 32 extends rearwardly and downwardly such that the drive unit is located within an area defined by the circumference of the rear wheels 20, 20 when viewed in side elevation.

Figure 1:
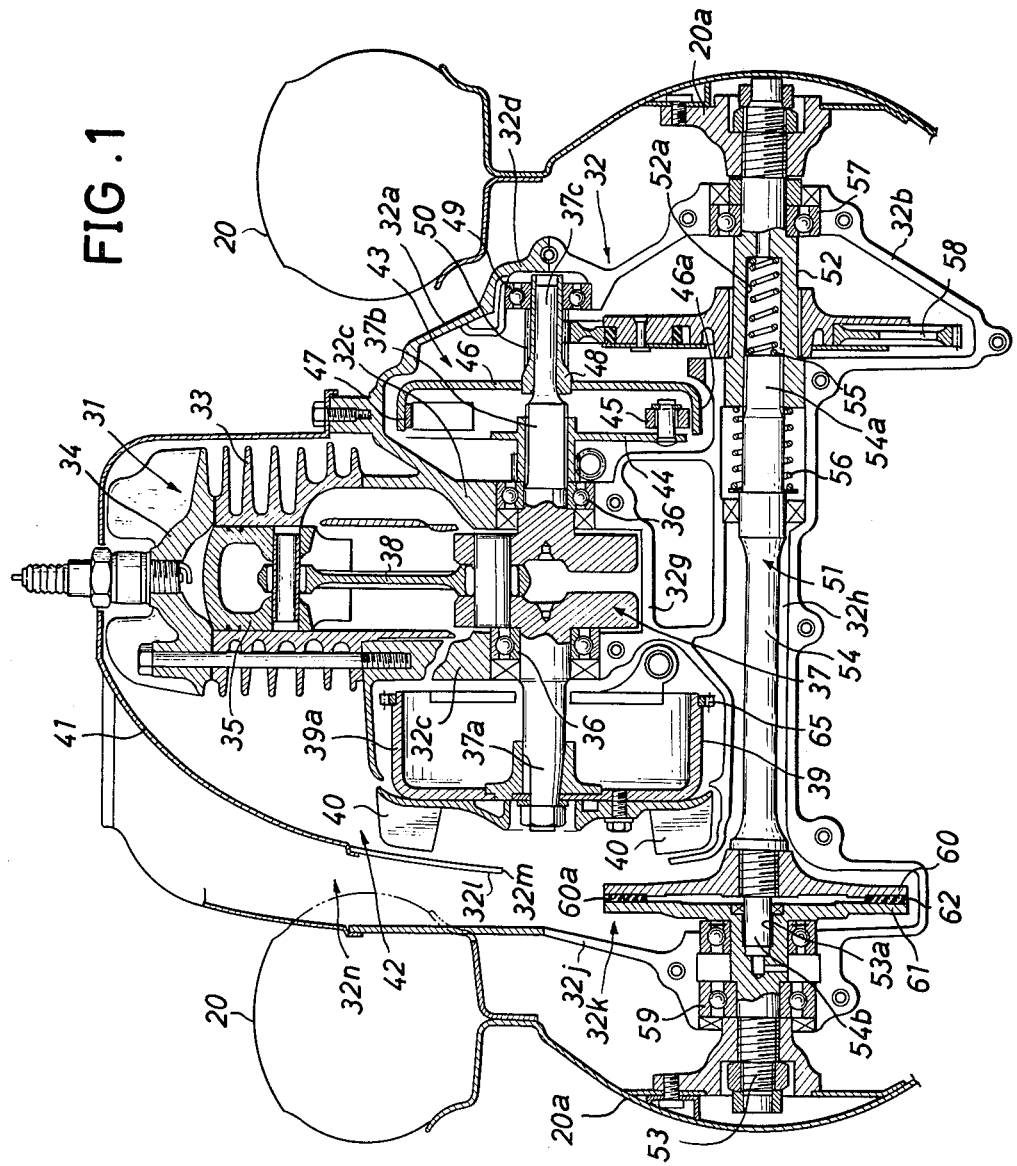
FIG. 1 is a cross-sectional view of a drive unit of the present invention, taken along line 1—1 of FIG. 2.
Figure 2:
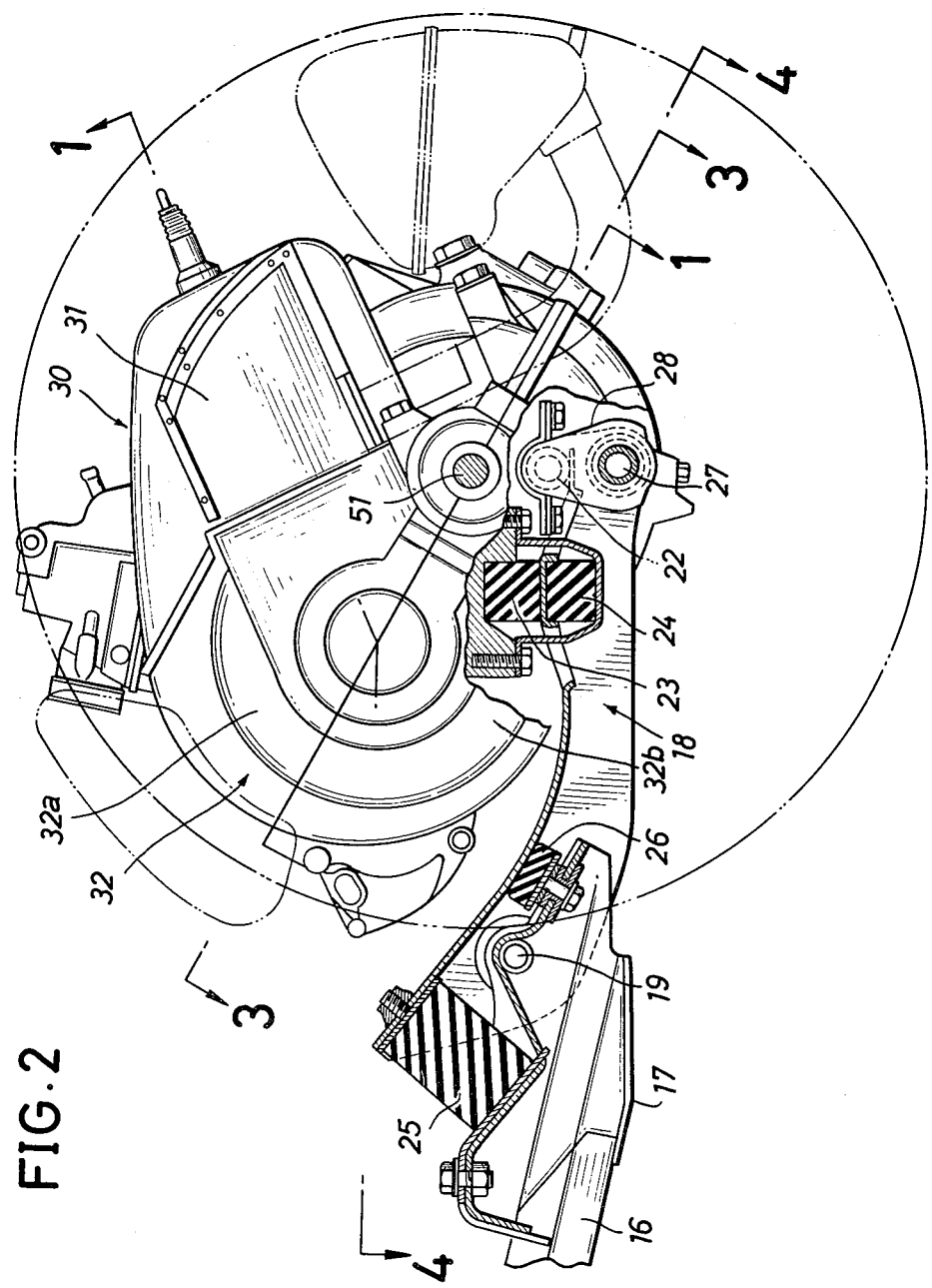
FIG. 2 is a side elevational view of the drive unit.

For clarity of understanding the drive unit 30 is shown in exaggerated form in FIG. 1 with the engine 31 projecting beyond the circumference of the rear wheels 20, 20. The engine 31 comprises a cylinder block 33 closed off by a cylinder head 34 and containing a piston 35 slidably fitted therein. A crankshaft 37 is rotatably journalled by a pair of bearings 36, 36 supported on respective partitions 32c, 32c of the housing 32, the crankshaft 37 being connected to the piston 35 by a connecting rod 38.

The crankshaft 37 has one end 37a connected to a flywheel 39 serving as an attachment base and casing for the magnet of an A.C. generator. An engine cooling fan 40 is attached to the flywheel 39 for supplying air flow through a passage 42 into a covering 41 which covers the cylinder block 33 and the cylinder head 34.

Figure 3:
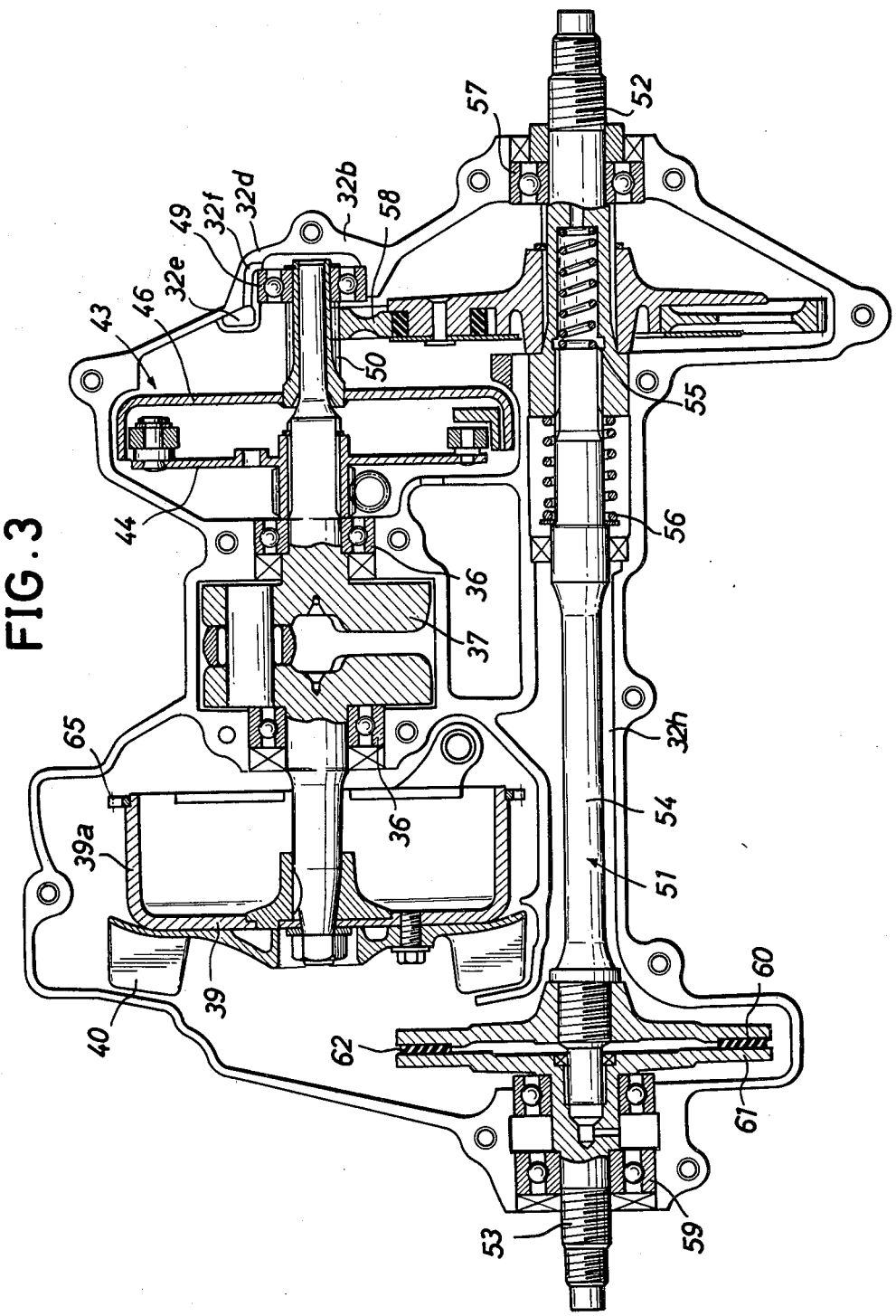
FIG. 3 is a cross-sectional view taken along line 3—3 of FIG. 2.
Figure 6:
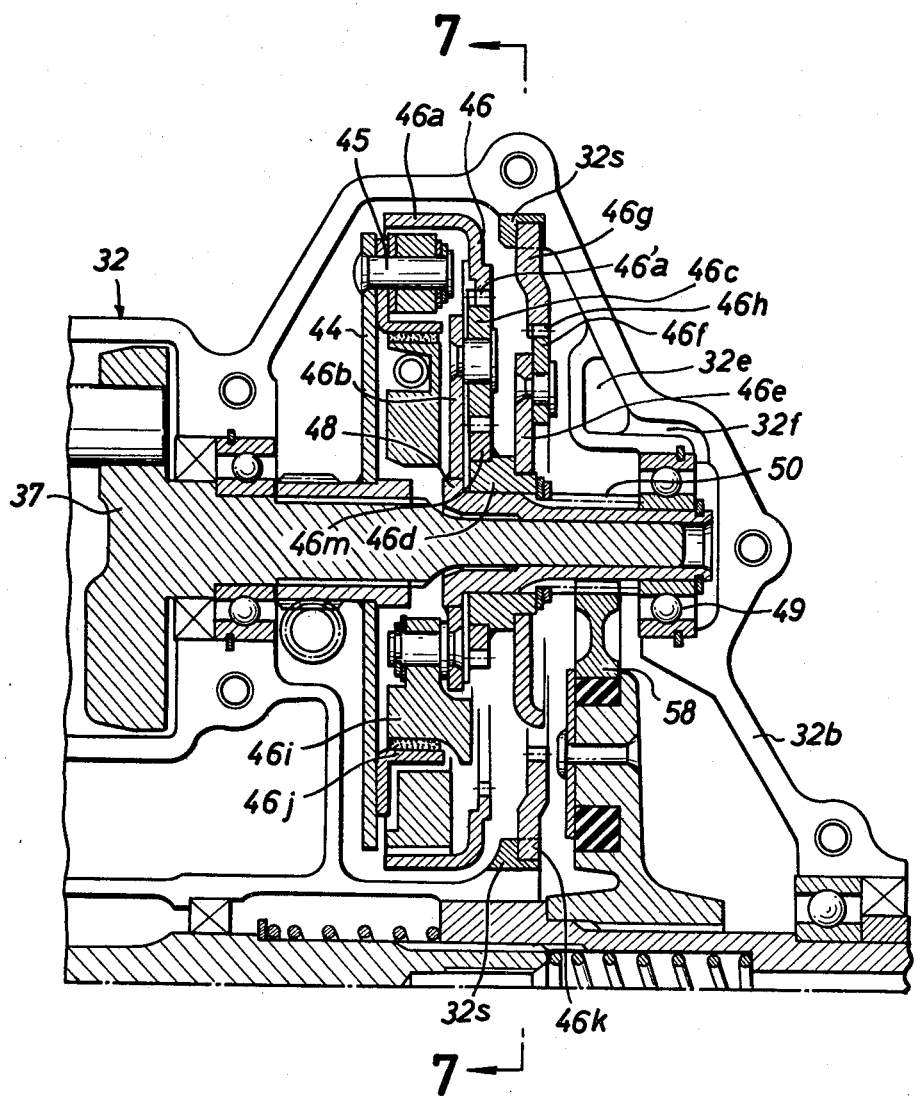
FIG. 6 is an enlarged cross-sectional view of a transmission mechanism.

The other end portion of the crankshaft 37 supports thereon a centrifugal clutch 43 which also acts as a speed changing device as described hereinbelow, and includes a base portion 37b supporting a clutch inner member or drive plate 44 fixed thereto by splines and having a member 45 movable radially outwardly under centrifugal forces. The clutch 43 also includes a drum-shaped outer member 46 having a flange 46a supporting a friction shoe 47 disposed a confronting relation to the member 45. The outer member 46 is secured to an inner end of a sleeve shaft 48 rotatably fitted over a distal end 37c of the crankshaft 37, the shaft 48 being supported at the other end on a bearing 49, mounted in a boss 32d of the housing 32. As shown in FIGS. 3 and 6, an oil reservoir 32e is provided in the housing 32 adjacent to the boss 32d for supplying oil to the bearing 49 through a passage 32f formed in the boss 32d. The sleeve shaft 48 has disposed on its periphery a speed reduction gear 50. Thus, the speed reduction gear 50 is coupled with the crankshaft 37 through the clutch 43.

The housing 32 includes a compartment 32g accommodating the crankshaft 37 and a compartment 32h accommodating a composite driven axle 51 extending parallel to the crankshaft 37. The axle 51 is composed of a wheel drive member 52 for the lefthand rear wheel 20 (as seen in FIG. 1), a wheel drive member 53 for the righthand rear wheel 20, and an intermediate axle member 54, the members 52, 53 and 54 being aligned with each other. The drive member 52 has an axial recess 52a into which there is fitted an end of the intermediate member 54. The intermediate member 54 is connected axially slidably by splines to the drive member 52 and urged axially leftwardly by a spring 55 disposed in the axial recess 52a and a spring 56 disposed around the intermediate member 54. The drive member 52 is journalled by a bearing 57 and has an end projecting outwardly of the housing 32 and supporting a wheel hub 20a of one of the rear wheels 20. A speed reduction spur gear 58 is corotatably mounted on the drive member 52 and held in driven mesh with the gear 50. Accordingly, rotation of the gear 50 causes the drive axle member 52 and intermediate axle member 54 (together defining a first drive portion of the axle) to corotate through the spur gear 58.

The other end 54b of the intermediate axle member 54 is rotatably fitted in an axial recess 53a in the drive axle member 53 (comprising a second drive portion of the axle), which is rotatably journalled by a pair of bearings 59 supported on the housing 32. The axle member 53 has an end projecting outwardly of the housing 32 and connected to a wheel hub 20a of the other rear wheel 20. The intermediate axle member 54 supports a disc-shaped flange 60 adjacent to the end 54b thereof. Another disc-shaped flange 61 is integrally formed with the drive member 53 in confronting relation to the flange 60. An annular friction plate 62 is disposed in an annular recess 60a in the flange 60 and located between the flanges 60, 61. The flanges 60, 61 are thus held in frictional engagement with each other as the annular friction plate 62 is pressed against the flange 61 under the force from the springs 55, 56. Thus, power flows from the intermediate axle member 54 through the flange 60, the friction plate 62, and the flange 61 to the drive member 53 for driving the rear wheel 20 with which the drive member 53 is connected. The flanges 60, 61 frictionally engaging each other constitute a differential means between the rear wheels 20, 20.

Figure 10:
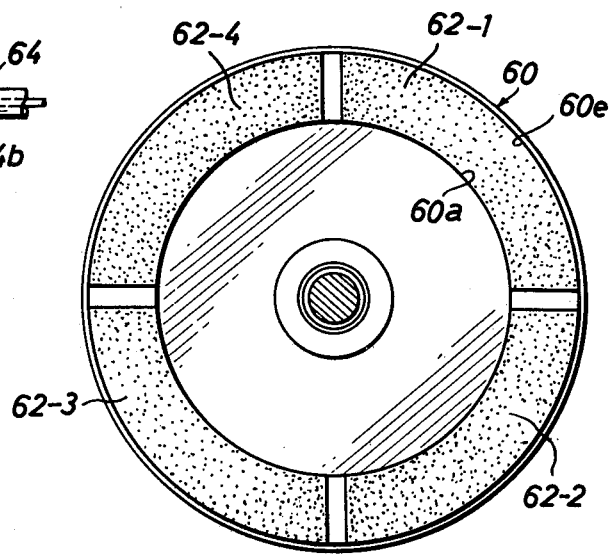
FIG. 10 is a view showing the interior of a power transmitting disc.

The friction plate 62 is interposed between the flanges 60, 61 but is not fixed thereto. As shown in FIG. 10, the friction plate 62 is preferably comprised of a plurality of arcuate members 62-1 through 62-4 received in the annular recess 60a of flange 60 and confined by an annular peripheral projection 60e extending toward the flange 61. The arcuate friction members 62-1 through 62-4 have the same curvature and are angularly spaced from each other at equal intervals.

The friction plate 62 comprising such plurality of arcuate members has several advantages. The friction members can break down frictional vibrations generated when the flanges 60, 61 slip for differential motion and hence attenuate noises resulting from such frictional vibrations. Heat produced by the differential motion is transmitted to the flanges 60, 61 through each friction member, which is thus prevented from deterioration due to heat. The separate friction members can easily be manufactured, assembled and replaced.

Figure 8:
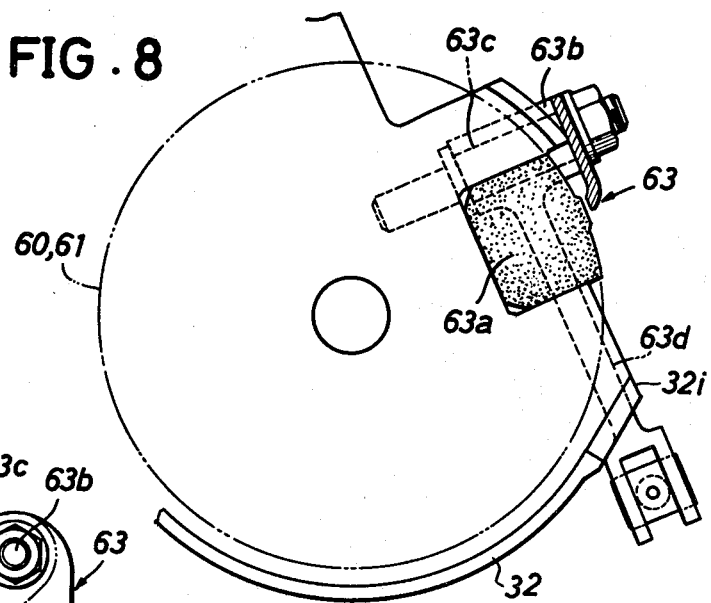
FIG. 8 is a side elevational view of a brake.
Figure 9:
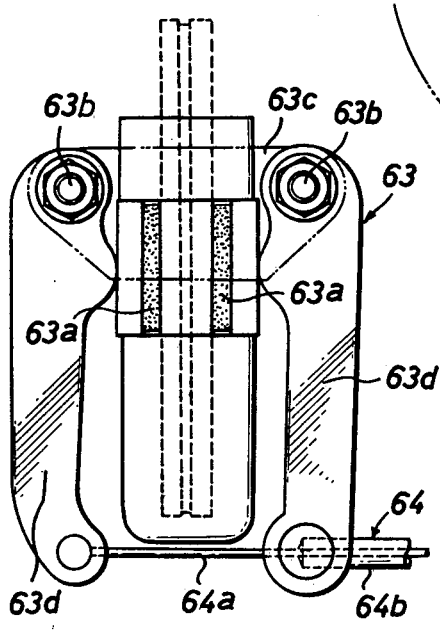
FIG. 9 is an end elevational view of the brake.

As illustrated in FIGS. 8 and 9, a disc-brake caliper 63 is supported on the housing 32 and disposed in confronting relation to a peripheral portion of the flanges 60, 61 at an opening 32i in the housing 32. The caliper 63 includes a pair of brake shoes 63a, 63a which face outer portions of the flanges 60, 61, respectively. In FIG. 9, the brake shoes 63a, 63a are movable toward the flanges 60, 61 by a pair of arms 63d, 63d, respectively, pivotally mounted on a support plate 63c by a pair of respective screws 63b, 63b. One of the arms 63d is connected to a wire 64a of a brake cable 64 and the other arm 63d is connected to a sheath 64b of the cable 64, the cable 64 being operatively connected to a brake actuator. When the brake actuator is operated, the wire 64a is pulled in to displace the arms 63d, 63d toward each other, thereby pressing the brake shoes 63a, 63a against the flanges 60, 61 for braking the rear wheels 20, 20.

In FIG. 1, the flanges 60, 61 are disposed outwardly of the flywheel 39, there being a space 32k between the flanges 60, 61 and a housing wall 32j adjacent thereto. The covering 41 has an opening 32m in a wall 32l thereof adjacent to the cooling fan 40, the opening 32m allowing the passage 42 to communicate with the space 32k. A passage 32n provided between the covering wall 32l and the housing wall 32j communicates with the atmosphere. When the cooling fan 40 is rotated by the rotation of the crankshaft 37, air comes in through the passage 32n and the opening 32m for cooling the cylinder block 33 and the cylinder head 34. At the same time, air flows through the space 32k to cool the flanges 60, 61, the friction plate 62, and the caliper 63.

Figure 4:
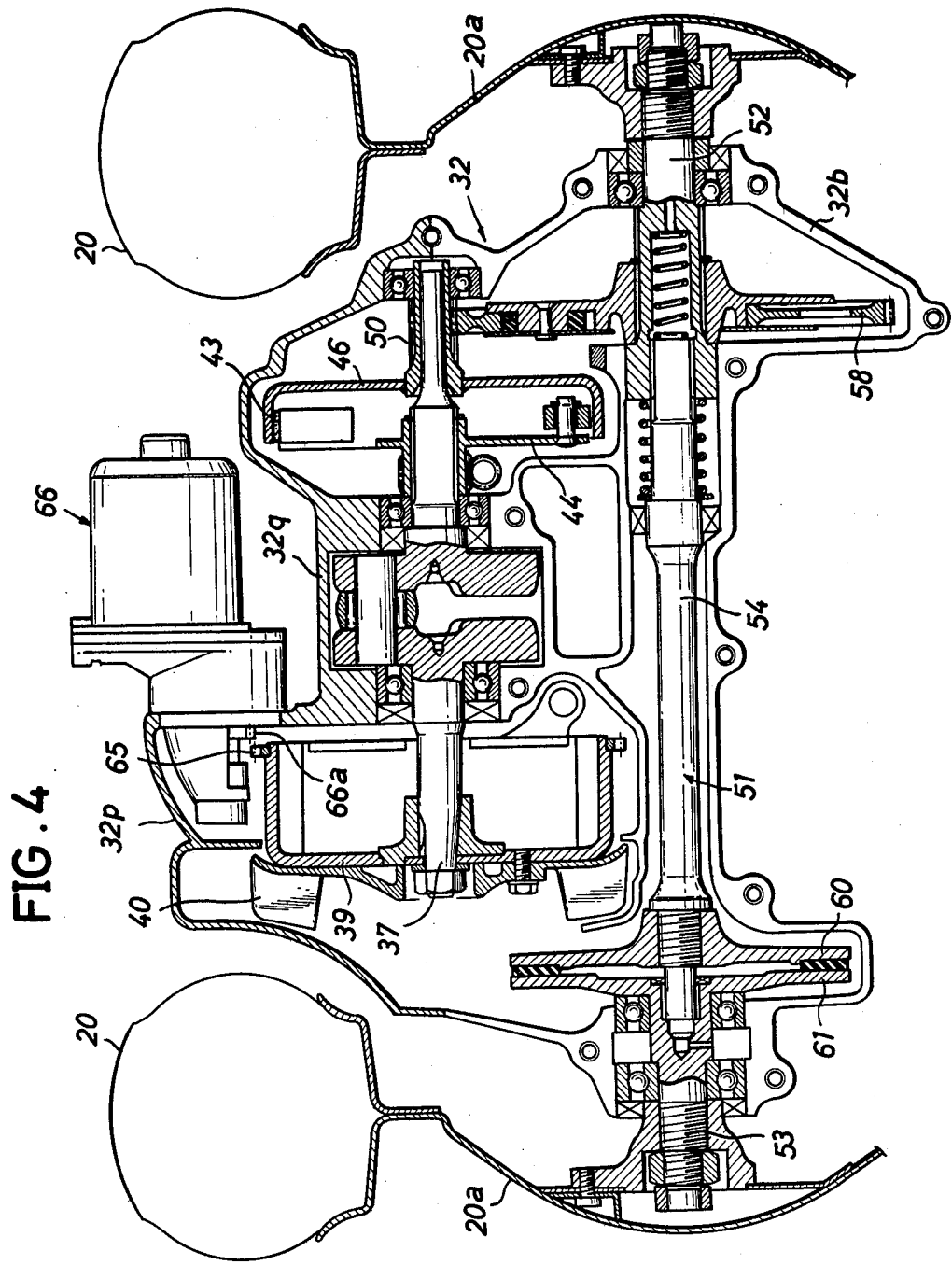
FIG. 4 is a cross-sectional view taken along line 4—4 of FIG. 2.
Figure 5:
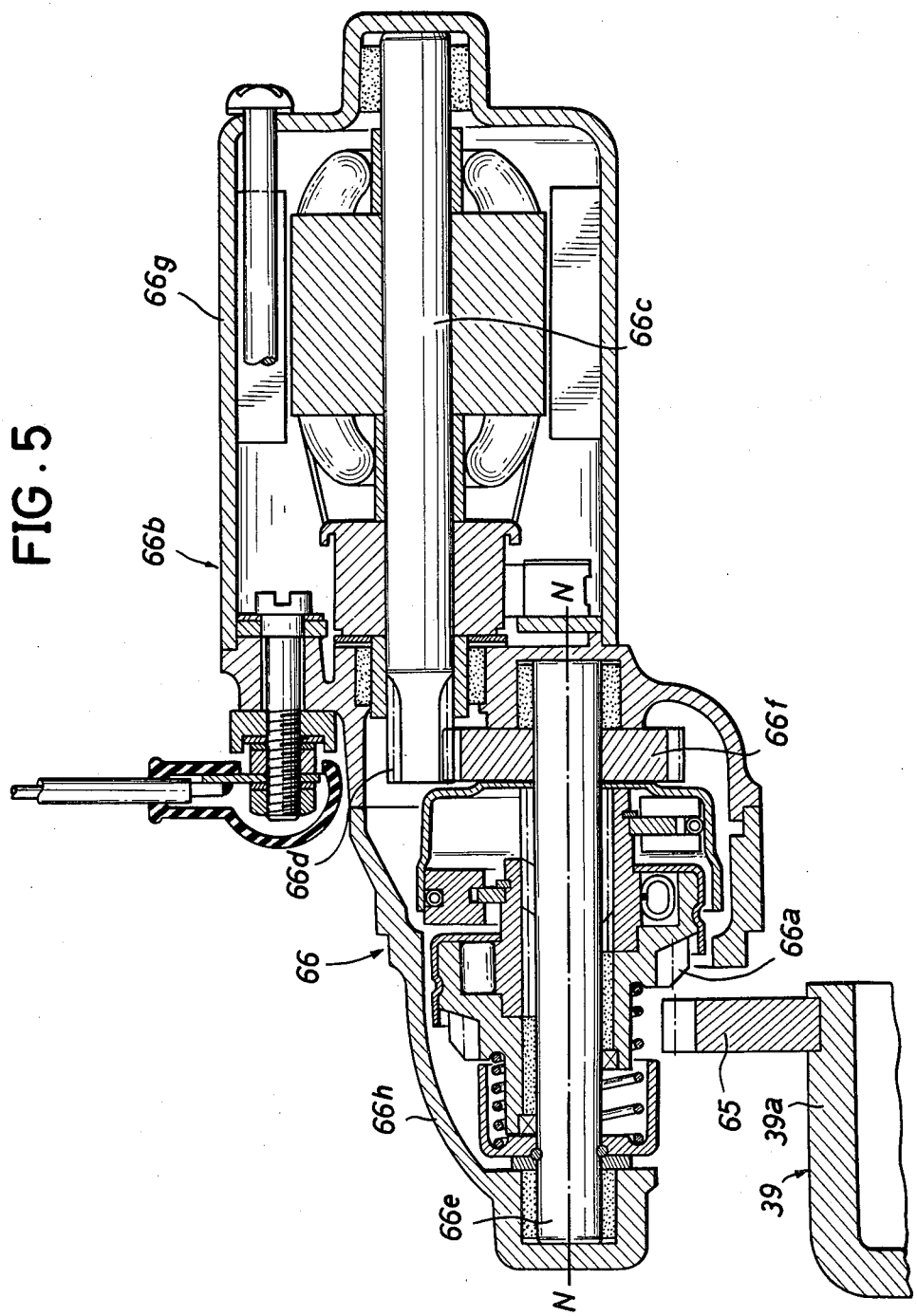
FIG. 5 is an enlarged cross-sectional view of a starting motor.

The flywheel 39 includes an annular flange 39a around which a starter ring 65 is mounted. With reference to FIG. 4, a starting motor 66 is mounted on a wall 32p of the housing 32 which is spaced outwardly of the flywheel 39, and has a pinion gear 66a located adjacent to the flywheel 39. As best shown in FIG. 5, the starting motor 66 has a housing 66b, a starter shaft 66c rotatably mounted in the housing 66b and having teeth 66d at its one end, an output shaft 66e extending parallel to the starter shaft 66c, and a gear 66f mounted on the output shaft 66e in mesh with the teeth 66d. The pinion gear 66a is slidably mounted on the output shaft 66e. Upon rotation of the starter shaft 66c, the output shaft 66e is rotated through the teeth 66d and the gear 66f. Then, the pinion gear 66a is advanced from its retracted position into driving mesh with the ring gear 65 to drivingly rotate the flywheel 39, whereupon the crankshaft 37 is rotated to start the engine 31. After the engine 31 has started, the pinion gear 66a is retracted away from the ring gear 65. Because the axle 51 is coupled by the centrifugal clutch 43 to the crankshaft 37, the starting motor 66 remains disconnected from the axle 51 during starting, and hence is free from undue strain.

With reference to FIGS. 4 and 5, housing 66b of the starting motor 66 includes a body 66g which, as shown in FIG. 4, is located in a recess 32g of the housing 32 between the flywheel 39 and the centrifugal clutch 43 and below the engine 31, and extends parallel to the crankshaft 37, with a front portion 66h of the body 66g protruding along the wall 32p of the housing 32. The starting motor 66 thus arranged occupies less space because it is partly disposed in the recess 32q and has a minimum number of parts because only the ring gear 65 acts between the pinion gear 66a and the flywheel 39.

Figure 7:
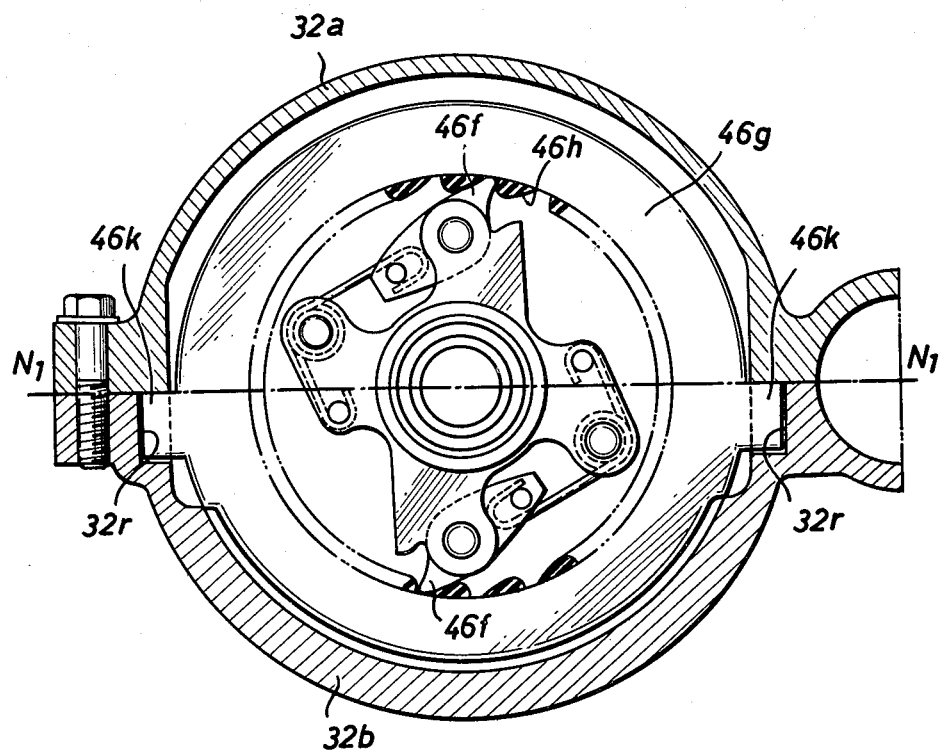
FIG. 7 is a cross-sectional view taken along line 7—7 of FIG. 6.

As shown in FIGS. 6 and 7, the drum-shaped outer member 46 is disposed in confronting relation to the drive plate 44 and has inner peripheral teeth 46a' held in mesh with a planet gear 46c supported on a carrier 46b. The planet gear 46c meshes with a sun gear 46m mounted on a support 46d fitted over the sleeve shaft 48. A clutch plate 46e mounted on the support 46d has prongs 46f held in engagement with inner peripheral teeth 46h of an annular ratched stator 46g locked to the housing 32. Thus, the clutch plate 46e moves only in one selected direction of rotation with respect to the stator 46g, providing a one-way clutch.

When the drive plate 44 rotates faster than a predetermined speed, the outer member 46 rotates with the member 45 in engagement, and the planet gear 46c as it rotates about its own axis revolves around the sun gear 46m which is prevented from rotation by the prongs 46f engaging the teeth 46h. The carrier 46b rotates at a reduced speed, to thereby enable the sleeve shaft 48 to rotate the axle 51 via the gears 50, 58.

As the engine speed increases, an inner member 46i pivotally mounted on the carrier 46b is caused under centrifugal forces to engage an outer member 46j fixed to the drive plate 44, whereupon the drive plate 44 is coupled with the sleeve shaft 48 to allow the gear 58 to rotate at a higher speed. At this time, the prongs 46f disengage the teeth 46h, and the outer member 46, the planet gear 46c and the sun gear 46m rotate in unison.

The stator 46g has a pair of substantially diametrically opposite projections 46k, 46k extending radially outwardly and disposed in offset relation to a diametrical line $N_1$—$N_1$ across the stator 46g, each of the projections 46k, 46k having a side aligned with the line $N_1$—$N_1$.

As mentioned hereinabove, the housing 32 is comprised of the upper and lower members 32a, 32b jointly accommodating the crankshaft 37, the centrifugal clutch 43, the flywheel 39, the axle 51, the gear 58, the flanges 60, 61, and so forth. In FIG. 7, the upper and lower members 32a, 32b jointly house the stator 46g and have a joint surface aligned with the line $N_1$—$N_1$. The lower member 32b has a pair of recesses 32r, 32r opening to the joint surface and receptive of the projections 46k, 46k, respectively, of the stator 46g. In assembly, the stator 46g is placed in the lower member 32b with the projections 46k, 46k received in the recesses 32r, 32r, respectively, and then the upper member 32a is assembled onto the lower member 32b with the joint surface holding down the projections 46k, 46k against the bottom of the recesses 32r, 32r. The projections 46k, 46k have sides supported by inner wall portions 32s, 32s of the housing 32. Accordingly, the stator 46g is held stationarily against rotation with respect to the housing 32.

The stator 46g can thus be located in the lower member 32b with utmost ease, and can be assembled readily into the housing 32. Since the housing 32 is separable into the upper and lower members 32a, 32b, the other parts can also be easily assembled, disassembled for repair, and serviced.

The composite axle 51 is assembled into the housing as follows: In FIG. 11, the intermediate axle member 54 and the drive axle member 52 are equipped with the springs 55, 56 and interconnected by a bolt 67 extending through an axial hole 52b in the drive axle member 52 and having a threaded end 67a received in a threaded hole 54c in an end of the intermediate axle member 54, with the springs 55, 56 being kept in compression. The other drive axle member 53 is attached to the intermediate axle member 54 via the flanges 60, 61. The composite axle 51 is then assembled into the housing 32 with the drive axle members 52, 53 being axially confined by the bearings 57, 59, respectively, (FIG. 1). The bolt 67 is then removed. The hub 20a of the rear wheel 20 is mounted on the projecting end of the drive axle member 52, the axle hole 52b being closed off by a sealing plug 68 (FIG. 12) screwed therein. A nut 69 is threaded over the end of the drive axle member 52. A split pin 70 is inserted diametrically across the nut 69, the end of the drive axle member 52, and the sealing plug 68 to retain the nut 69 and the sealing plug 68. FIG. 13 shows a modification in which a sealing plug 168 has a head projecting beyond the end of the drive axle member 52.

When the starting motor 66 is actuated, the pinion gear 66a drivingly meshes with the ring gear 65 on the flywheel 39 to rotate the crankshaft 37 until the engine 31 is started. Upon starting of the engine 31, the drive plate 44 and the drum 46 of the centrifugal clutch 43 engage each other to enable the gear 50 and hence the gear 58 meshing therewith to rotate the drive axle member 52 directly and the drive axle member 53 via the flanges 60, 61, whereupon the wheels 20, 20 start being driven.

Although a certain preferred embodiment has been shown and described in detail, it should be understood that changes and modifications may be made therein without departing from the scope of the appended claims.

What is claimed is:

1. A drive unit for a vehicle having two juxtaposed drive wheels, comprising:

an engine;

an axle for supporting on the ends thereof said drive wheels, said axle comprising first and second drive portions arranged coaxially and in alignment with each other;

a final output gear operatively coupled with said engine and mounted on said first drive portion of said axle adjacent to one end thereof so as to rotate said first drive portion by power of said engine, said one end of said first drive portion supporting one of said drive wheels;

power transmitting means for coupling said second drive portion with said first drive portion so as to rotate said second drive portion upon rotation of said first drive portion, said power transmitting means including a pair of flanges mounted on said first and second drive portions in confronting relation, and means for frictionally engaging said flanges with each other, wherein said first and second drive portions may rotate relative to each other against the force of said friction engaging means;

said second drive portion having one of said flanges mounted at one end thereof, and supporting the other of said drive wheels at the other end thereof, said one end of said second drive portion being arranged substantially adjacent to said other drive wheel;

said engine being disposed between said final output gear and said power transmitting means;

a crankshaft extending parallel to said axle;

a clutch mounted on one end of said crankshaft, said clutch operatively cooperating with said final output gear so as to transmit said power of said engine to said final output gear; and a flywheel mounted on the other end of said crankshaft, said engine being disposed between said clutch and said flywheel.

2. A drive unit according to claim 1, said clutch comprising a centrifugal clutch.

3. A drive unit according to claim 10, said clutch comprising a drive member rotatable with said crankshaft and a driven member fitted rotatably over said crankshaft, including a speed changing device interposed between said drive and driven members.

4. A drive unit according to claim 3, said driven member having a gear drivable by said drive member and held in driving mesh with said final output gear.

5. A drive unit according to claim 3, said speed changing device comprising a planetary gear mechanism.

6. A drive unit according to claim 3, including a housing, said one end of said crankshaft being supported by a bearing on said housing, said housing having a lubricant reservoir adjacent to said bearing for supplying the latter with lubricant.

7. A drive unit according to claim 1, said flywheel having a ring gear mounted therearound, including a starting motor having a pinion gear selectively movable into driving mesh with said ring gear.

8. A drive unit according to claim 7, said housing including a recess between said flywheel and said clutch, said starting motor being located in said recess.

9. A drive unit according to claim 1, including a cooling fan mounted on said flywheel.

10. A drive unit according to claim 9, said cooling fan being located in a space extending around said power transmitting means and said engine and communicating with atmosphere.

11. A drive unit according to claim 5, said planetary gear mechanism including a stator having a pair of subtantially symmetrically located projections, including a housing comprising upper and lower members, one of said upper and lower members having recesses receiving said projections, respectively, the other housing member holding said projections in said recesses when said upper and lower members are combined.

* * * * *